(12) United States Patent
Pinchuk

(10) Patent No.: US 9,468,158 B2
(45) Date of Patent: Oct. 18, 2016

(54) APPARATUS AND METHOD FOR CONTROLLING A GREENHOUSE ENVIRONMENT

(75) Inventor: Omer Pinchuk, Tel Aviv (IL)

(73) Assignee: PHAZA ENERGY LTD., Tel Aviv (IL)

( * ) Notice: Subject to any disclaimer, the term of this patent is extended or adjusted under 35 U.S.C. 154(b) by 58 days.

(21) Appl. No.: 14/233,156

(22) PCT Filed: Jul. 18, 2011

(86) PCT No.: PCT/IB2011/053188
§ 371 (c)(1),
(2), (4) Date: Mar. 31, 2014

(87) PCT Pub. No.: WO2013/011351
PCT Pub. Date: Jan. 24, 2013

(65) Prior Publication Data
US 2014/0196880 A1    Jul. 17, 2014

(51) Int. Cl.
*F24F 3/14* (2006.01)
*F24F 6/00* (2006.01)
(Continued)

(52) U.S. Cl.
CPC .............. *A01G 9/241* (2013.01); *A01G 9/246* (2013.01); *F24F 11/0001* (2013.01);
(Continued)

(58) Field of Classification Search
CPC  A01G 9/246; F24F 11/0001; F24F 11/0015; F24F 11/0012; F24F 12/002; Y02B 30/563
USPC ...... 165/222, 248, 257, 48.1; 62/176.6, 118, 62/159, 161; 47/17
See application file for complete search history.

(56) References Cited

U.S. PATENT DOCUMENTS 1,870,329 A * 8/1932 Otto ................ A01G 9/246
                                                        165/115
1,875,126 A * 8/1932 Owen ............... A01G 9/246
                                                          47/17
(Continued)

FOREIGN PATENT DOCUMENTS

DE         2316030         10/1974
DE         2316030 A1  *  10/1974  ............... F24F 3/04
(Continued)

OTHER PUBLICATIONS

International Search Report for PCT/IB2011/053188 mailed Jan. 2, 2013.
(Continued)

*Primary Examiner* — Marc Norman
*Assistant Examiner* — Claire Rojohn, III
(74) *Attorney, Agent, or Firm* — A.C. Entis-IP Ltd.

(57) ABSTRACT

Apparatus for controlling an environment in a greenhouse, the apparatus comprising: first and second heat exchangers, each comprising a radiator and a fan system for driving air through the radiator; a first refrigerant circulation system that circulates a refrigerant fluid between and through the radiators; a heater controllable to heat the refrigerant; a controller that controls the apparatus to operate selectively in a maintenance mode or a flush mode, wherein in the maintenance mode the heater heats the refrigerant and the first and second fan systems drive air from outside to inside the greenhouse and through the radiators to acquire heat from the refrigerant, and in the flush mode the first fan system vents air from inside to outside the greenhouse through its respective radiator to deposit heat in the refrigerant and the second fan system drives air from outside to inside the greenhouse and through its respective radiator to acquire the heat deposited in the refrigerant.

15 Claims, 7 Drawing Sheets

(51) Int. Cl.
*F28D 7/06* (2006.01)
*A01G 9/24* (2006.01)
*F24F 11/00* (2006.01)
*F24F 12/00* (2006.01)

(52) U.S. Cl.
CPC ......... *F24F 12/002* (2013.01); *F24F 11/0012* (2013.01); *F24F 11/0015* (2013.01); *Y02B 30/563* (2013.01); *Y02P 60/147* (2015.11)

(56) References Cited

U.S. PATENT DOCUMENTS

| | | | | | |
|---|---|---|---|---|---|
| 2,399,696 | A | * | 5/1946 | Schreiber | A01G 9/246 34/90 |
| 3,246,643 | A | * | 4/1966 | Stark | A01G 9/246 126/110 B |
| 3,404,618 | A | * | 10/1968 | Jacobs | A01G 9/246 454/236 |
| 4,000,778 | A | * | 1/1977 | Laing | F24F 12/002 165/104.31 |
| 5,713,154 | A | * | 2/1998 | Goldstein | A01G 9/24 47/17 |
| 6,446,385 | B1 | * | 9/2002 | Crutcher | A01G 9/18 47/17 |
| 2009/0025287 | A1 | * | 1/2009 | Lee | A01G 7/00 47/17 |
| 2011/0259019 | A1 | * | 10/2011 | Chang | G05D 22/02 62/3.6 |
| 2015/0115047 | A1 | * | 4/2015 | Okamoto | F24F 3/153 236/1 E |
| 2015/0253020 | A1 | * | 9/2015 | Honda | F25B 13/00 62/190 |
| 2015/0300676 | A1 | * | 10/2015 | Motomura | F25B 13/00 62/186 |

FOREIGN PATENT DOCUMENTS

| | | |
|---|---|---|
| EP | 1953467 | 8/2008 |
| JP | 2010200634 | 1/2010 |
| JP | 2010200634 A * | 9/2010 |

OTHER PUBLICATIONS

European Search Report for 11748999.7 dated Mar. 2, 2015.

* cited by examiner

APPARATUS AND METHOD FOR CONTROLLING A GREENHOUSE ENVIRONMENT

RELATED APPLICATIONS

The present application is a US National Phase of PCT Application No. PCT/IB2011/053188, filed on Jul. 18, 2011, the disclosure of which is incorporated herein by reference.

TECHNICAL FIELD

Embodiments of the invention relate to controlling temperature and humidity in a greenhouse.

BACKGROUND

Air temperature and relative humidity of an environment in which plants grow affect plant growth and health by affecting photosynthesis and transpiration. Photosynthesis is a process by which plants convert carbon dioxide and water to organic compounds needed for plant growth and metabolism. Transpiration is a process by which plants draw water and nutrients required for plant growth and metabolism from soil into their roots and transport the water and nutrients to their leaves and other plant organs.

Photosynthesis and transpiration are temperature and relative humidity dependent. Relative humidity, is a ratio equal to an amount of water contained in the atmosphere per unit volume of air divided by a maximum amount of water a unit volume of the air can contain before the water begins to condense out of the air. Water condenses out of air when the air's relative humidity is equal to 100%. Photosynthesis generally increases with increase in temperature. Transpiration is affected by a rate at which water drawn in from the soil and transported to plant leaves and organs evaporates from surfaces of the leaves and organs and increases with increase in rate of evaporation. Evaporation of water from plant surfaces also aids a plant in dissipating heat and regulating plant body temperature. Rate of evaporation and therefore transpiration, and a plants ability to cool itself, generally decreases with increasing relative humidity.

Plants adapted to different natural environments, for example, desert plants such as cactuses and tropical plants such as orchids, thrive in different temperature and relative humidity ranges. If they are subjected to temperatures and relative humidities outside of the ranges for which they are adapted, they generally do not do well, and may become diseased. Relative humidity in an environment in which a plant grows that is greater than a maximum for which the plant is adapted can result in a reduction in rate of evaporation to such an extent that concomitant reduction in plant transpiration, and the plant's ability to dissipate heat and regulate its body temperature, damages plant metabolism and health. High relative humidity also tends to result in condensation of water droplets on surfaces of plants when ambient temperature in the environment decreases during the diurnal cycle. The condensed moisture promotes germination of fungal pathogen spores, such as Botrytis and powdery mildew, on the plant surfaces that can damage or kill the plants.

Because of the sensitivity of plants to temperature and RH, artificial environments, such as provided by greenhouses, in which plants are commercially grown, must generally be monitored and controlled to maintain air temperature and humidity within desired ranges. For many greenhouse environments in which leafy plants and vegetables are grown, it is advantageous for temperature to be maintained in a range from about 18° C. to about 22° C. and relative humidity in a range from about 75% to about 82%.

In the closed environment of a greenhouse, RH tends to increase as a result of plant transpiration and evaporation of water from the soil and can be difficult to control. Typically, relative humidity in a greenhouse is controlled using a longstanding conventional procedure, in which hot humid air in the greenhouse is periodically vented to the outside environment and replaced with cooler air drawn into the greenhouse from the outside. The indrawn cool air is heated to bring its temperature within a desired range of greenhouse air temperatures. Heating the indrawn cool air also reduces its relative humidity. The capacity of air to hold water increases and its RH decreases with increasing air temperature. Relative humidity of indrawn cool air, even if it is 100% (i.e. at which relative humidity water begins to condense out of the air) may be reduced substantially by increasing that air's temperature. For example relative humidity of outside air at a temperature of 18° C. and 100% relative humidity is decreased to a relative humidity of 50% by heating to a temperature of 25° C.

Whereas the longstanding conventional procedure for controlling relative humidity by periodically venting hot humid greenhouse air and replacing it with cooler air drawn into the greenhouse from the outside and heated is generally effective, it exposes greenhouse plants to relatively large fluctuations in air temperature. The procedure also consumes relatively large amounts of energy and is therefore expensive.

By way of example, air temperature in a greenhouse using conventional humidity control systems may fluctuate from a low temperature equal to about an outside air temperature, for example, 10° C., to a maximum temperature of about 22° C. Relative humidity of the inside air may suffer a range from about 70% to about 100%. During a diurnal cycle for which outside relative humidity of outside air fluctuates between about 60% to about 70% and temperature of outside air between about 12° C. and 16° C. a conventional system may consume more than about 2,000 kWh (kilowatt hours) of energy.

SUMMARY

An embodiment of the invention relates to providing a greenhouse environment control (GECO) system for controlling temperature and relative humidity in a greenhouse by periodically venting warm humid air in the greenhouse and replacing it with air drawn in from the outside that is heated by heat extracted from the vented warm humid air. Between periods when warm humid air is vented, the GECO system generates and heats a moderate flow of outside air into the greenhouse. The process is relatively energy efficient and characterized by relatively moderate fluctuations in greenhouse air temperature that results from exchanging greenhouse inside air with air from the outside.

In accordance with an embodiment of the invention, the GECO system comprises an air circulation and heat exchange system and a controller that controls the circulation and heat exchange system selectively to operate in a "flush" mode or in a "maintenance" mode. The circulation and heat exchange system comprises a first "vent" heat exchanger that is coupled by a refrigerant fluid and a refrigerant flow system to a second, "intake" heat exchanger. The vent heat exchanger comprises a vent fan system selectively controllable to drive warm moist air from inside the greenhouse to outside the greenhouse or to drive air from outside to inside the greenhouse, through a relatively long air flow path in a large efficient "vent" radiator. The intake heat exchanger comprises an intake fan system controllable to draw relatively cold air from outside the greenhouse to inside the greenhouse through a relatively long air flow path in a large and efficient "intake" radiator.

In the flush mode, the GECO controller controls the vent fan system to drive hot humid air from the greenhouse through the vent radiator to the outside, and the intake fan system to draw air from the outside into the greenhouse through the intake radiator to replace the vented air. The vent radiator extracts heat from the vented air to heat the refrigerant fluid and cool the vented air. The refrigerant flow system transports the refrigerant heated by heat extracted by the vent radiator from the vented air to the intake radiator. The intake radiator heats air drawn into the greenhouse by the intake fan system and cools the refrigerant. After heat is removed from the refrigerant to heat the intake air, the cooled refrigerant is recycled by the refrigerant flow system to the vent radiator where it is heated again and recycled back to the intake radiator. Optionally, the vent heat exchanger cools venting air to a temperature substantially equal to an ambient temperature of the outside air and the intake radiator heats drawn in air to a desired greenhouse temperature.

In the maintenance mode the GECO system operates to maintain temperature and RH in the greenhouse within desired ranges by generating a relatively slow and steady influx of heated outside air into the greenhouse. To generate the influx, the GECO controller controls both the intake and venting fan systems to draw outside air into the greenhouse and heat the drawn in air to a desired greenhouse temperature. The rate of influx is determined to create an air pressure inside the greenhouse that is slightly greater than atmospheric pressure, and a resultant leakage of air out from the greenhouse equal to the rate of influx. Optionally, air leakage out of a greenhouse having a floor area of about 1,000 $m^2$ (square meter) and height of about 3 m is greater than or equal to about 2,500 $m^3$/hr (cubic meters per hour). Optionally, the air leakage is less than about 3,500 $m^3$/hr. In an embodiment of the invention the air leakage may be equal to about 3,000 $m^3$/hr (cubic meters per hour). Optionally, the desired greenhouse temperature is equal to about 22° C. To provide heat for heating the drawn in outside air, the controller couples the refrigerant flow system to a heat source.

By controlling durations and frequency of switching between flushing and temperature maintenance modes of operation in accordance with an embodiment of the invention, the GECO system provides substantial savings in amounts of energy required to control temperature and RH in a greenhouse and reduces amplitude of fluctuations in temperature and RH of air in the greenhouse.

An embodiment of the invention relates to providing a system, hereinafter a water agitator (WAGIT), that operates to clean surfaces of leaves and plant parts of moisture that may have accumulated on the surfaces. The system comprises a source of acoustic energy controllable to transmit sound waves which generate vibrations in the leaves and plant parts that agitate and shake water droplets from their surfaces. In an embodiment of the invention, the acoustic source is tunable to transmit acoustic waves at resonant vibration frequencies of plant leaves.

There is therefore provided in accordance with an embodiment of the invention, apparatus for controlling an environment in a greenhouse, the apparatus comprising: first and second heat exchangers, each comprising a radiator and a fan system for driving air through the radiator; a first refrigerant circulation system that circulates a refrigerant fluid between and through the radiators; a heater controllable to heat the refrigerant; a controller that controls the apparatus to operate selectively in a maintenance mode or a flush mode, wherein in the maintenance mode the heater heats the refrigerant and the first and second fan systems drive air from outside to inside the greenhouse and through the radiators to acquire heat from the refrigerant, and in the flush mode the first fan system vents air from inside to outside the greenhouse through its respective radiator to deposit heat in the refrigerant and the second fan system drives air from outside to inside the greenhouse and through its respective radiator to acquire the heat deposited in the refrigerant. Optionally the apparatus comprises a third heat exchanger controllable to heat air inside the greenhouse. Optionally, the third heat exchanger comprises a radiator, a second refrigerant flow system that streams a refrigerant through the radiator, a heater that heats the refrigerant in the second refrigerant flow system and a fan system that drives air inside the greenhouse through the radiator to acquire heat from the refrigerant and remain in the greenhouse.

Optionally the apparatus comprises a fluid flow control valve controllable to connect the first and second refrigerant flow systems so that heated refrigerant from the second refrigerant flow system can flow into the first refrigerant flow system. Optionally, in the maintenance mode, the controller controls the fluid control valve to connect the first and second refrigerant flow systems.

In an embodiment of the invention, in the maintenance mode, the controller controls the third heat exchanger to substantially refrain from heating air inside the greenhouse.

In an embodiment of the invention, the controller controls the third heat exchanger to heat air inside the greenhouse when temperature of the inside air drops below a predetermined minimum air temperature.

In an embodiment of the invention, in the maintenance mode the controller controls the fan systems of the first and second heat exchangers to draw air from outside to inside the green house at an average flow rate that is substantially proportional to a volume of the greenhouse. Optionally, the flow rate is greater than about 2,500 $m^3$/hr (cubic meters per hour) per 3,000 $m^3$ of greenhouse volume. Additionally or alternatively, the flow rate is less than about 3,500 $m^3$/hr per 3,000 $m^3$ of greenhouse volume. Optionally, the flow rate is equal to about 3,000 $m^3$/hr per 3,000 $m^3$ of greenhouse volume.

In an embodiment of the invention, the controller controls the apparatus to operate in a flush mode if relative humidity in the greenhouse is greater than a predetermined minimum relative humidity.

In an embodiment of the invention, the controller switches operation of the apparatus between flush and maintenance modes at regular intervals. Optionally, duration of a period of operation in the flush mode is the same for a plurality of consecutive periods of operation in the flush mode. Optionally, the flush mode periods are repeated at a repetition frequency greater than about 0.8 per hour. Additionally or alternatively, the repetition frequency is less than about 1.2 per hour. In an embodiment of the invention, the repetition frequency is equal to about 1 per hour.

In an embodiment of the invention, periods of operation in the flush mode have duration less than or equal to about 10 minutes. In an embodiment of the invention, periods of operation in the flush mode duration greater than or equal to about 5 minutes. In an embodiment of the invention, periods of operation in the flush mode have duration equal to about 6 minutes. In an embodiment of the invention, the controller initiates periods of operation in the maintenance mode substantially at times at which periods of operation in the flush mode end.

There is further provided in accordance with an embodiment of the invention, a method of controlling an environment in a greenhouse, the method comprising: periodically, during first periods, venting air from inside to outside the greenhouse while drawing air from outside to inside the greenhouse and heating drawn in air with heat extracted from the vented air; and during second periods between the first periods, drawing in air from outside to inside the greenhouse and heating the air as it is drawn in.

Optionally the method comprises initiating first periods when the relative humidity becomes greater than a predetermined relative humidity. Alternatively or additionally the method comprises switching between first and second periods at regular intervals. Optionally the method comprises determining a same duration for a plurality of consecutive first periods.

In an embodiment of the invention the method comprises initiating second periods substantially at times when first periods end.

In an embodiment of the invention, an average flow rate at which air is drawn in from outside to inside the green house during the second periods is substantially proportional to the greenhouse volume. Optionally, the flow rate is greater than about 2,500 m$^3$/hr per 3,000 m$^3$ of greenhouse volume. Additionally or alternatively, the flow rate is less than about 3,500 m$^3$/hr per 3,000 m$^3$ of greenhouse volume. Optionally, the flow rate is equal to about 3,000 m$^3$/hr per 3,000 m$^3$ of greenhouse volume.

In an embodiment of the invention, first periods have duration less than or equal to about 10 minutes. In an embodiment of the invention, first periods have duration greater than or equal to about 5 minutes. In an embodiment of the invention, first periods have duration equal to about 6 minutes.

There is further provided in accordance with an embodiment of the invention, a method of removing water droplets from surfaces of plants growing in a greenhouse, the method comprising: providing an acoustic generator configured to generate acoustic waves in the greenhouse; and operating the acoustic generator to transmit sound waves that are incident on, and generate vibrations in, surfaces of the plants that cause water droplets on the surfaces to roll or be shaken off the surfaces. Optionally, the sound waves are characterized by a frequency that is substantially equal to a resonant frequency of vibration of the plant surfaces. Additionally or alternatively, the sound waves are characterized by a frequency that is substantially equal to a resonant frequency of vibration of the water droplets.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

In the following detailed description, components and operation of a conventional greenhouse environment control system are described and discussed with reference to FIGS. 1A and 1B. FIGS. 1C and 1D show graphs of relative humidity and temperature of air in a greenhouse environment controlled by conventional environment control system such as that shown in FIG. 1A. Components and operation of a GECO environment control system in accordance with an embodiment of the invention are described and discussed with reference to FIGS. 2A and 2B. FIGS. 2C and 2D show graphs of relative humidity and temperature of air in a greenhouse environment controlled by a GECO system in accordance with an embodiment of the invention such as the GECO system shown in FIG. 1A. Operation of a WAGIT system for accelerating removal of water from plant surfaces is discussed with reference to FIG. 3.

Figure 1A:
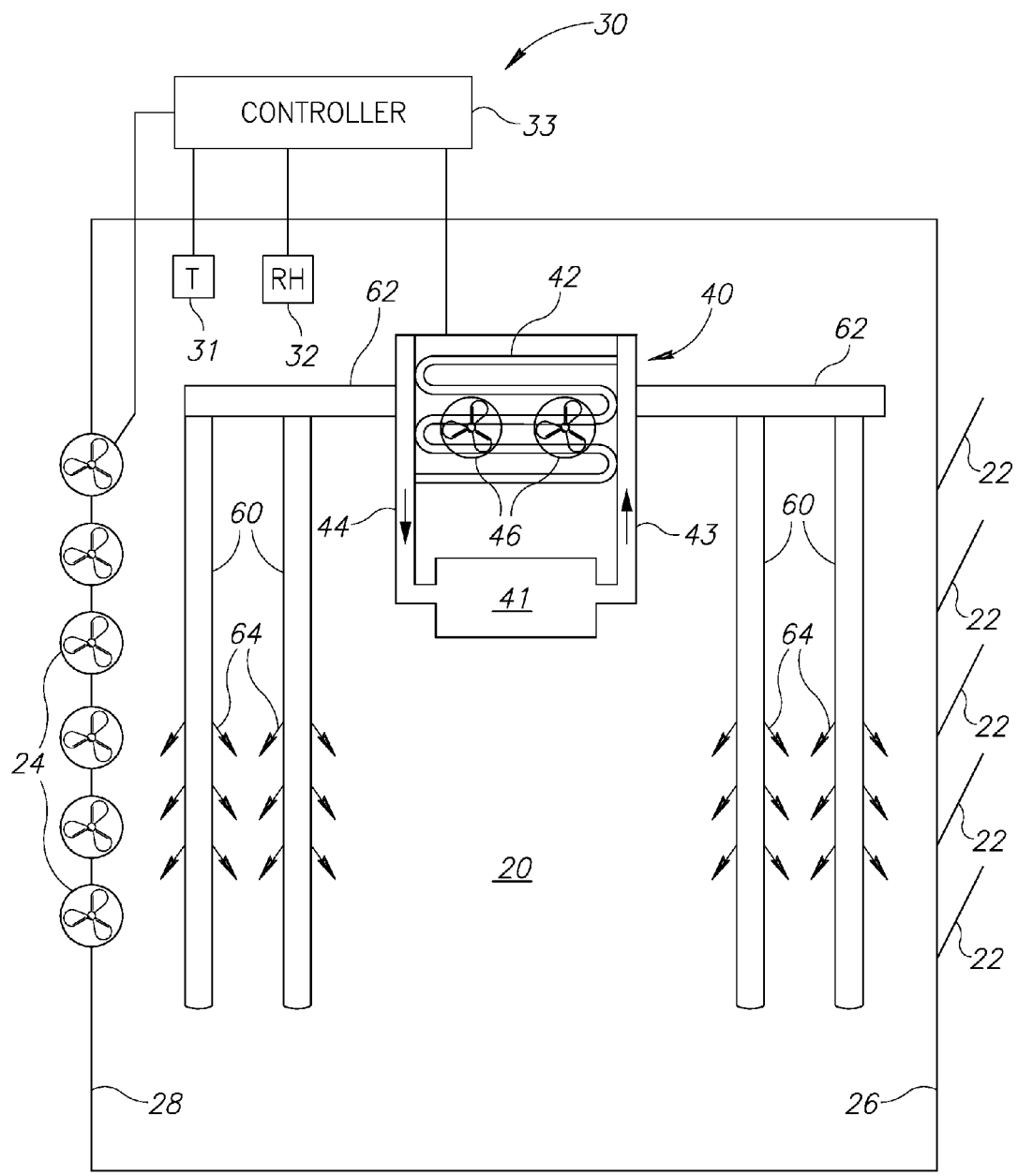
FIG. 1A schematically shows a conventional environment control system operating to maintain temperature and relative humidity in a greenhouse.

FIG. 1A schematically shows a greenhouse 20 having windows 22 and exhaust fans 24 mounted respectively in opposite walls 26 and 28 of the green house. Greenhouse 20 comprises a conventional environment control system 30 for controlling temperature and RH in the greenhouse. The environment control system comprises an "inside" heat exchanger 40 for heating air inside greenhouse 20 to a desired temperature, manifold flow sleeves 60 for distributing the heated air to different regions in the greenhouse and sensors 31 and 32 for monitoring temperature and RH respectively of air inside the greenhouse. A controller 33 controls the environment control system, windows 22 and exhaust fans 24 of greenhouse 20 responsive to measurements of temperature and RH provided by sensors 31 and 32.

Heat exchanger 40 comprises a radiator 42 and a refrigerant flow system comprising a refrigerant heater 41 and a refrigerant pump (not shown) that streams heated refrigerant, generally water, into and out of the radiator. The refrigerant flow system is connected to radiator 42 by inlet and outlet pipes 43 and 44 respectively. Heat exchanger 40 optionally comprises two blowers 46 controllable to drive air in the greenhouse through radiator 42, where the air is heated to a desired temperature by the refrigerant streaming through the radiator. Heated refrigerant enters radiator 42 via inlet pipe 43 and after heating greenhouse air blown through the radiator by blowers 46, the refrigerant is cooled and leaves the radiator via outlet pipe 44 to return to the refrigerant flow system and heater 41 where it is reheated and returned to again flow through the radiator. It is noted that in FIG. 1A and figures that follow, heater 41 is schematically shown located in greenhouse 20 and close to heat exchanger 40. Heater 41 does not of course have to be located inside greenhouse 20, and in practice the heater is generally located outside the greenhouse, and often far from the green house.

Air blown through and heated in radiator 42 flows out of heat exchanger 40 and, optionally, into manifold flow sleeves 60 through coupling sleeves 62. The manifold sleeves are typically made of plastic sheeting and/or fabric, and are inflated by the heated air that enters them from the heat exchanger. Sleeves 60 are formed having holes (not shown) through which heated air from heat exchanger 40 flowing in the sleeves flows out of the sleeves to mix with air in the greenhouse to maintain a desired greenhouse air temperature and relative humidity. Arrows 64 schematically represent air flowing out of sleeves 62. Whereas in FIG. 1A heated air exiting heat exchanger 40 is directed into manifold sleeves 60 for dispersion into the greenhouse volume, in some greenhouses heated air is dispersed differently. For example, in some greenhouses heated air from a heat exchanger flows directly from the heat exchanger into the greenhouse volume. By way of another example, in some greenhouses heated water is streamed through a network of pipes on the greenhouse floor to heat the air inside the greenhouse.

Figure 1B:
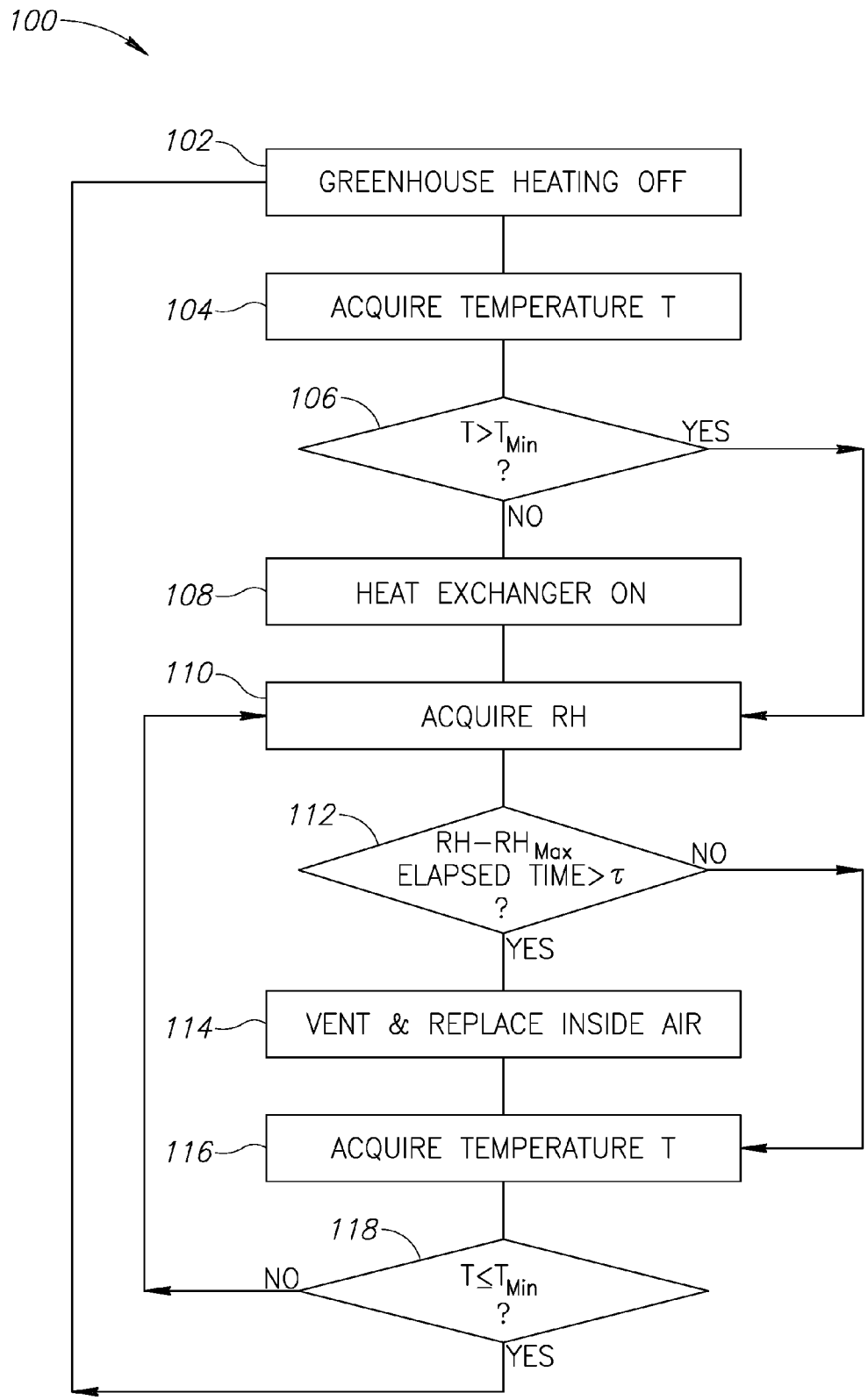
FIG. 1B shows a flow chart descriptive of operation of the conventional environment control system shown in FIG. 1A.
Figure 1C:
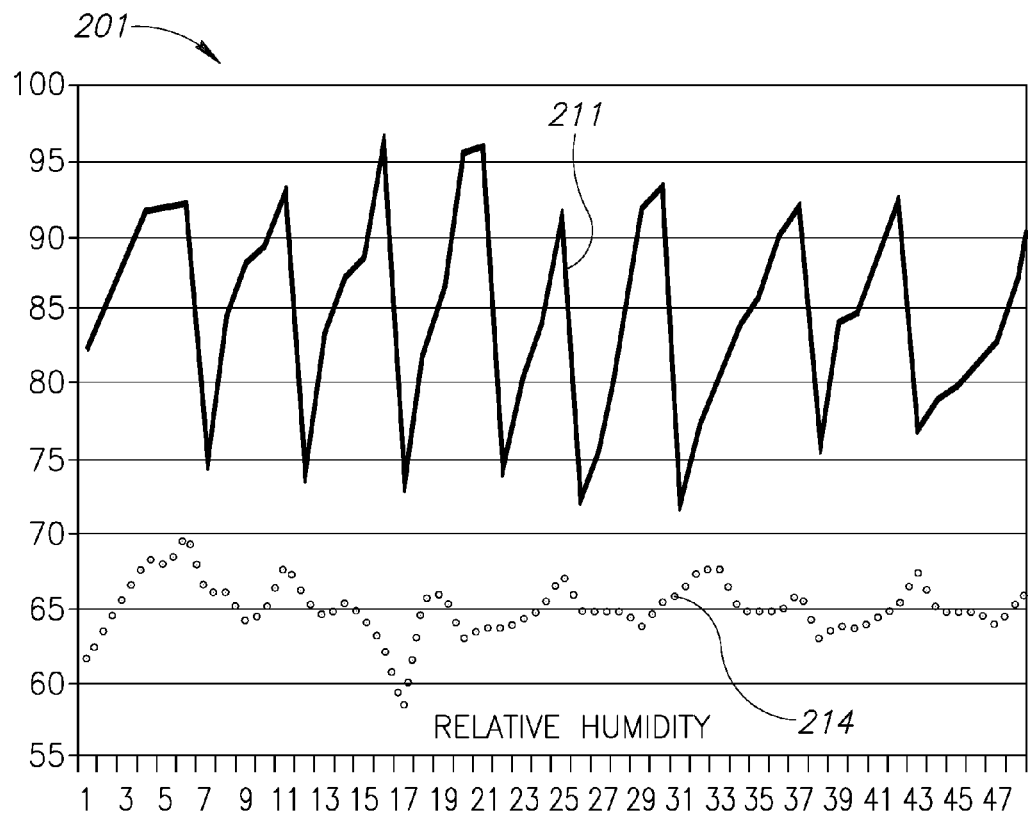
FIGS. 1C and 1D show graphs of relative humidity and temperature respectively of air in a greenhouse environment controlled by the conventional environment control system shown in FIG. 1A.
Figure 1D:
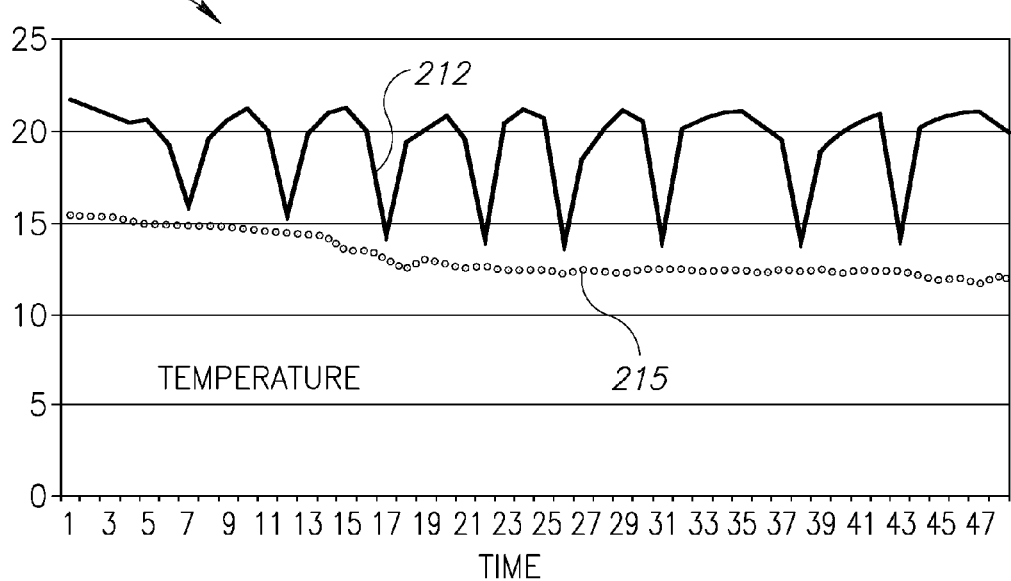

Controller 33 optionally controls environment control system 30 to control temperature and relative humidity in greenhouse 20 by periodically replacing hot humid air inside the greenhouse with air drawn in from the outside and heated, in accordance with a conventional exemplary algorithm schematically represented by a flow diagram 100 shown in FIG. 1B. The numeral 100 is used to refer to the flow diagram and to the algorithm which it represents.

Generally, a greenhouse environment control system, such as environment control system 30, is off during the day in climates for which there is sufficient solar energy incident on the greenhouse to maintain greenhouse air temperature above a desired minimum. In flow diagram 100 it is assumed that initially, as shown in a block 102 of the flow diagram, that controller 33 controls heat exchanger 40 to be off and therefore environment control system 30 to refrain from heating air in greenhouse 20.

In a block 104, controller 33 optionally acquires a measurement "T" of air temperature in greenhouse 20 from temperature sensor 31. In a decision block 106 the controller determines if the measured temperature T is less than a predetermined desirable minimum temperature "$T_{Min}$". Whereas $T_{Min}$ is dependent upon a type of plants grown in greenhouse 20, for many plants $T_{Min}$ is advantageously equal to about 20° C. If, in decision block 106, controller 33 determines that T is less than $T_{Min}$, as generally might occur towards nightfall, the controller optionally proceeds to a block 108 and turns on heat exchanger 40 to heat air in greenhouse 20 to a temperature above $T_{Min}$. Turning on the heat exchanger generally involves turning on blowers 46 and the refrigerant flow system to stream hot refrigerant through radiator 42 (FIG. 1A). Thereafter, controller 33 optionally proceeds to a block 110.

If instead of finding in decision block 106 that T is less than $T_{Min}$ as assumed in the preceding paragraph the controller 33 finds that T is greater than or equal to $T_{Min}$ the controller skips block 108 and proceeds to block 110.

In a block 110, whether or not controller 33 skips block 108, the controller acquires a measurement "RH" of relative humidity of the air in greenhouse 20 from humidity sensor 32 and in a block 112, the controller compares RH to a given desired maximum, "$RH_{Max}$". In a decision block 112 the controller also, optionally, determines whether at a time at which RH is acquired in block 110, an elapsed time since air in the greenhouse was last replaced by heated air from the outside is greater than an optionally predetermined time interval "τ". If in decision block 112 RH is less than $RH_{Max}$, or the elapsed time is less than τ, controller 33 skips a block 114 discussed below, and advances to a block 116.

In block 116 the controller acquires a temperature measurement T, and in a decision block 118 determines whether T>$T_{Min}$. If T is greater than $T_{Min}$ the controller returns to block 102 and turns off heat exchanger 40. On the other hand, if T≤$T_{Min}$, controller 33 returns to block 110, acquires measurement new RH, and in block determines if the new RH is greater than $RH_{Max}$.

If in decision block 112 controller 33 determines that RH is greater than $RH_{Max}$ and the elapsed time is greater than τ, controller 33 proceeds to block 114 to replace overly humid air in greenhouse 20 with outside air to reduce humidity in the greenhouse. To accomplish the replacement, the controller opens windows 22 and controls fans 24 to vent air from inside greenhouse 20 and draw air in from the outside through open windows 22 to replace the vented air.

In block 116, after replacement of air in greenhouse 20, controller 33 acquires a temperature measurement T, and in decision block 118, if T>$T_{Min}$ the controller returns to block 102 and turns off heat exchanger 40. On the other hand, if T<$T_{Min}$, controller 33 continues to heat air (block 108) in greenhouse 20 and returns to block 110.

Generally air drawn in from outside greenhouse 20 to replace air inside the greenhouse is relatively cold, and typically has a temperature that is substantially less than $T_{Min}$. As a result, immediately after replacing air inside greenhouse 20 with outside air, temperature of air in greenhouse 20 is less than $T_{Min}$. For a period after air replacement therefore, from decision block 118 controller 33 generally repeatedly returns to block 110 to cycle through blocks 110-118, heating air in greenhouse 20 until the controller determines in decision block 118 that temperature of air in the greenhouse is greater than the desired minimum $T_{Min}$.

For many greenhouse environments $RH_{Max}$ is advantageously equal to about 85%. Time interval τ is determined to prevent cold air from outside greenhouse 20 being drawn in to replace greenhouse air so frequently that a rate at which cold air drawn into greenhouse 20 must be heated to maintain a desired greenhouse temperature exceeds a capacity of the heat exchanger to heat the drawn in air.

FIGS. 1C and 1D show graphs 201 and 202 of relative humidity and temperature respectively of air inside and outside of greenhouse 20 having an environment control system 30 operating in accordance with an algorithm similar to algorithm 100. In graphs 201 and 202 solid curves 211 and 212 show relative humidity and temperature respectively for air inside greenhouse 20 as a function of time for a period of two days. Time in hours is shown along the graphs' abscissas. Dotted curves 214 and 215 show relative humidity and temperature respectively for air outside greenhouse 20 as a function of time for the same two day period. The curves in graphs 201 and 202 were experimentally determined for a greenhouse, hereinafter also referred to as a 3 m×1,000 m² greenhouse, having height equal to about 3 m and floor space equal to about 1,000 m². Heat exchanger 40 when turned on provided 290 kW of energy to heat air streaming at 14,000 m³/hr (cubic meters/hr) through radiator 42. On the average, for each diurnal cycle the heat exchanger operated for about seven hours. In consequence, conventional environment control system 30 consumed about 2,030 kWh (kilowatt hours) of energy during each diurnal cycle.

From the graphs it is seen that both relative humidity and temperature of air in greenhouse 20 cyclically fluctuate with relatively large amplitudes in cadence with the repeated replacement of hot humid greenhouse inside air with cold, relatively low humidity outside air. Temperature fluctuates with amplitude of about 7° C. between about 14° C. and about 21° C. and relative humidity fluctuates with an amplitude of about 20% between about 75% and 95%.

Figure 2A:
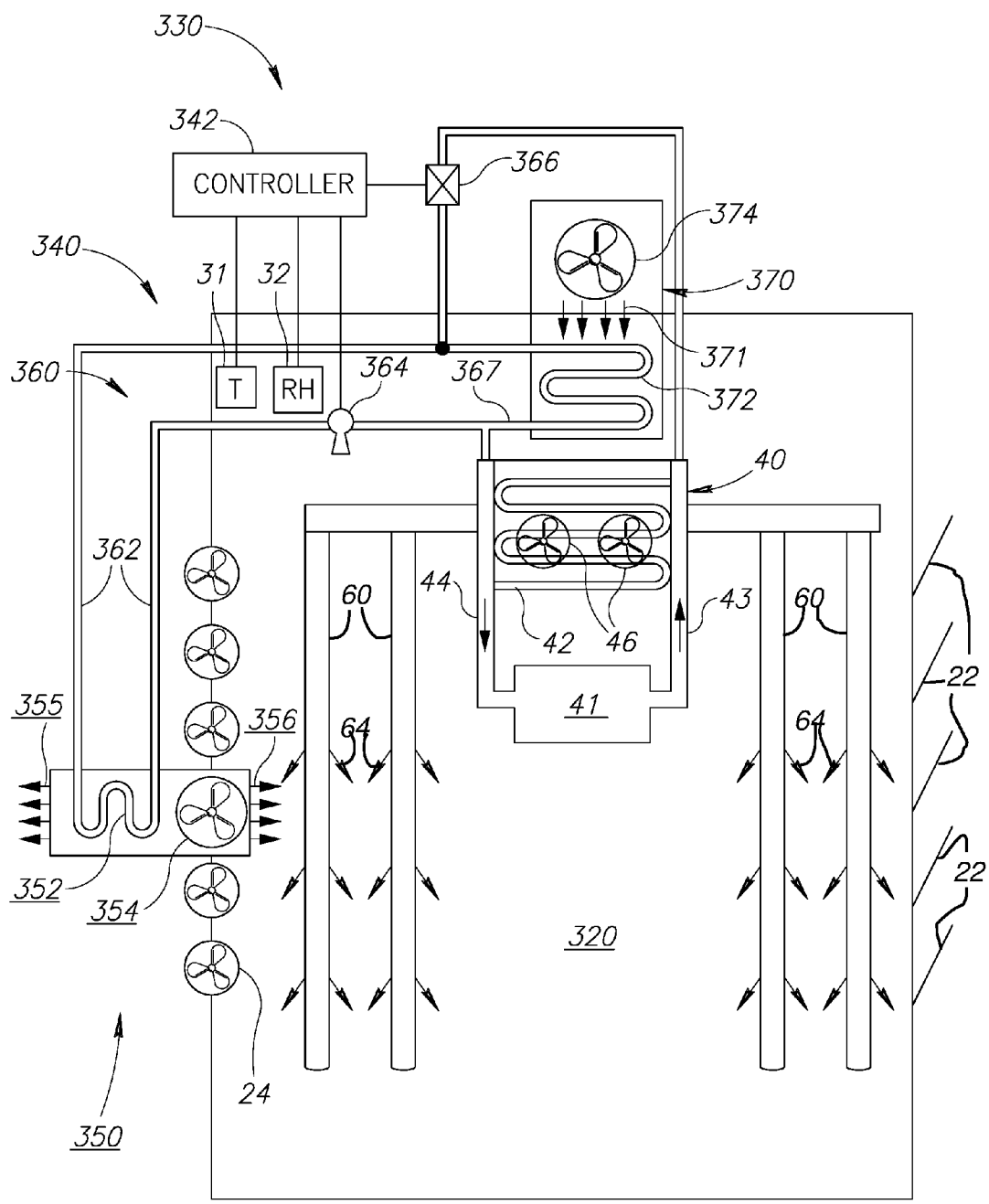
FIG. 2A schematically shows a GECO greenhouse environment control system operating to maintain temperature and relative humidity in a greenhouse, in accordance with an embodiment of the invention.

FIG. 2A schematically shows a greenhouse 320 comprising a greenhouse environment control system 330, that is a GECO system 330, also referred to as GECO 330, used to control the environment in the greenhouse, in accordance with an embodiment of the invention.

GECO system 330 optionally comprises components, such as an inside heat exchanger 40 and vent fans 24 comprised in environment control system 30, and in addition comprises an air circulation and heat exchange system 340, hereinafter also referred to as a climate control system (CCS) 340, in accordance with an embodiment of the invention.

CCS 340 optionally comprises a controller 342 and a vent heat exchanger 350 coupled by a refrigerant fluid flow system 360 to an intake heat exchanger 370. Vent heat exchanger 350 comprises a vent radiator 352 and vent fan system 354. The vent fan system is selectively controllable to drive warm moist air from inside the greenhouse to outside the greenhouse or to drive air from outside to inside the greenhouse, through a relatively long air flow path in a large efficient "vent" radiator 352. Airflow arrows 355 pointing from vent heat exchanger 350 towards the outside of greenhouse 320 and airflow arrows 356 pointing from the vent heat exchanger towards the inside of the greenhouse, schematically represent the selectable directions in which vent fan system 354 can drive air. Intake heat exchanger 370 comprises an intake fan system 374 controllable to draw relatively cold air from outside the greenhouse in a direction indicated by airflow arrows 371 to inside the greenhouse through a relatively long air flow path in a large and efficient "intake" radiator 372.

Fluid flow control system 360 comprises refrigerant circulation pipes 362 that connect intake radiator 372 with vent radiator 352 and a refrigerant pump 364 controllable to pump refrigerant in the circulation pipes between the vent and intake radiators. Circulation pipes 362 are connected by a fluid flow control valve 366 to inlet pipe 43 through which hot refrigerant from refrigerant heater 41 is introduced into radiator 42. The circulation pipes are optionally connected by a T joint 367 to outlet pipe 44 through which relatively cold refrigerant leaves radiator 42. Controller 342 controls heat exchanger 40, and controls flow valve 366, pump 364, vent and intake heat exchangers 350 and 370 to selectively operate CCS in a flush mode or a maintenance mode.

In the flush mode, controller 342 controls vent fan system 354 to drive air from inside greenhouse 320 in a direction indicated by airflow arrows 350 to outside of the greenhouse and intake fan system 374 to drive air from outside the greenhouse to inside the greenhouse in a direction indicated by airflow arrows 371. In the flush mode the controller closes flow valve 366 and operates refrigerant pump 364 to circulate refrigerant from vent radiator 352 to intake radiator 372.

Hot humid air driven by vent fan system 354 through vent radiator 352 in the direction of airflow arrows 355 is cooled in passing through the vent radiator and heats refrigerant fluid in the radiator. Pump 364 pumps heated refrigerant from the vent radiator to intake radiator 372 where it is cooled in heating air driven by intake fan system 374 through the intake radiator. In the flush mode CCS 340 replaces hot humid air vented by vent heat exchanger 350 from inside greenhouse 320 with cold air drawn into the greenhouse by intake heat exchanger 370 and heats the indrawn air with heat that the vent heat exchanger extracts from the vented air. In an embodiment of the invention, heat extracted from the vented air is sufficient to heat indrawn air to a temperature substantially equal to a desired greenhouse air temperature.

In the maintenance mode, controller 342 controls vent fan system 354 to drive air from outside greenhouse 320 to inside the greenhouse in a direction of airflow arrows 356 and intake fan system to drive air from outside to inside in a direction of airflow arrows 371. The controller also opens flow valve 366 to connect circulation pipes 362 to inlet pipe 43 so that refrigerant fluid in the inlet pipe heated by heater 41 that heats refrigerant fluid for heat exchanger 40 can enter circulation pipes 362. Controller 342 operates pump 364 to circulate the heated refrigerant fluid entering the pipes from inlet pipe 43 through radiators 352 and 372 to heat air drawn in from the outside by vent and intake fan systems 354 and 374. The controller controls a flow rate at which the indrawn and heated air enters greenhouse 320 so that air pressure in the greenhouse is slightly greater than atmospheric pressure and heated air from outside flows into the greenhouse at a moderate rate and replaces air inside the greenhouse.

Figure 2B:
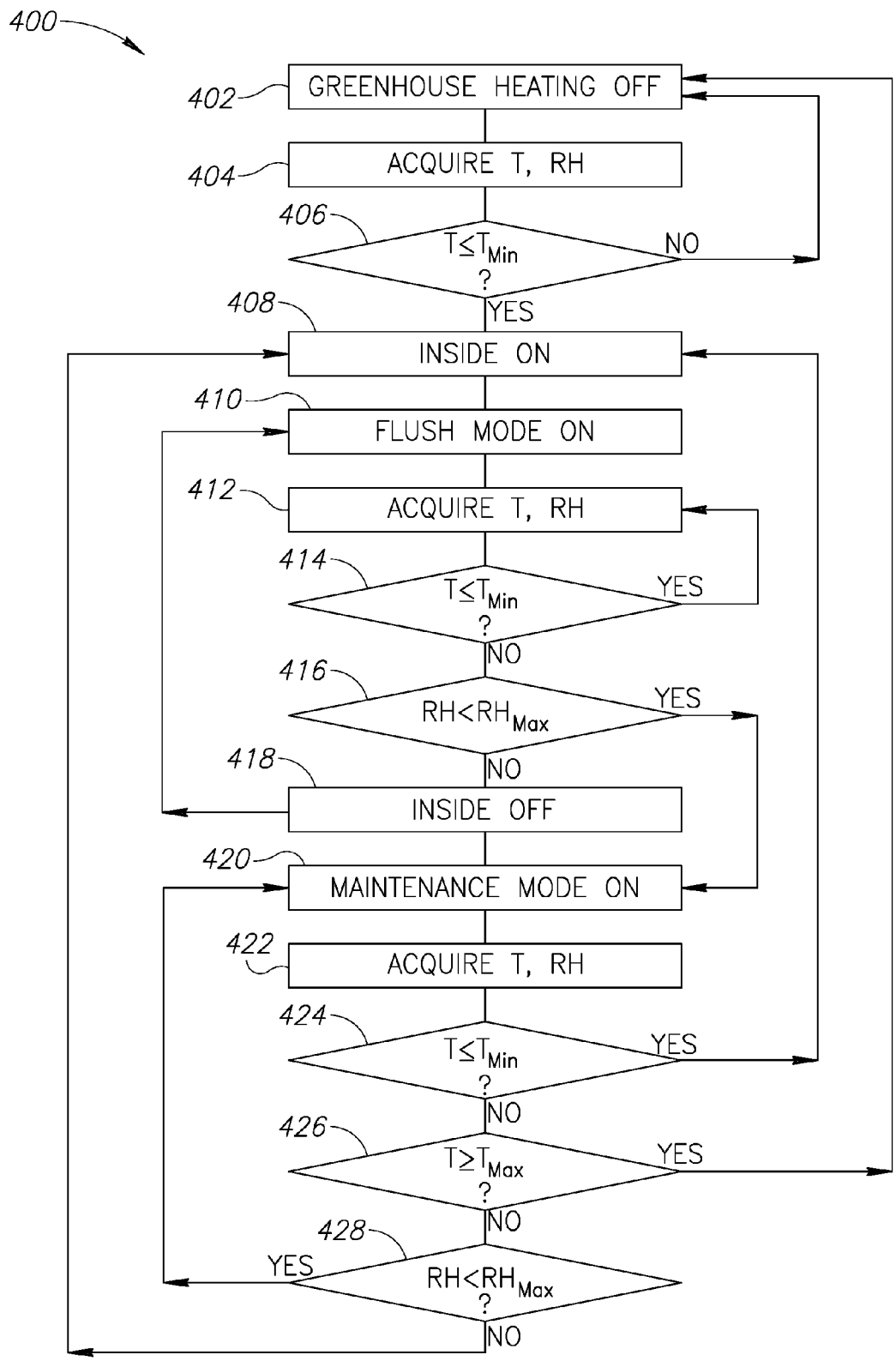
FIG. 2B shows a flow chart descriptive of operation of the GECO system shown in FIG. 2A, in accordance with an embodiment of the invention.
Figure 2C:
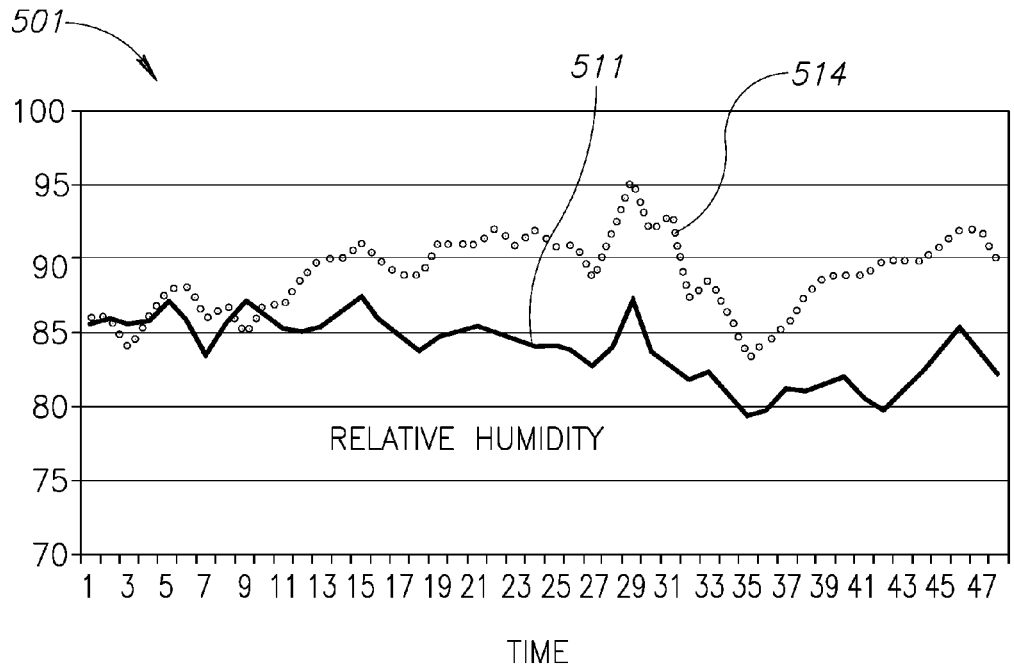
FIGS. 2C and 2D show graphs of relative humidity and temperature respectively of air in a greenhouse environment controlled by the GECO system shown in FIG. 2A, in accordance with an embodiment of the invention.
Figure 2D:
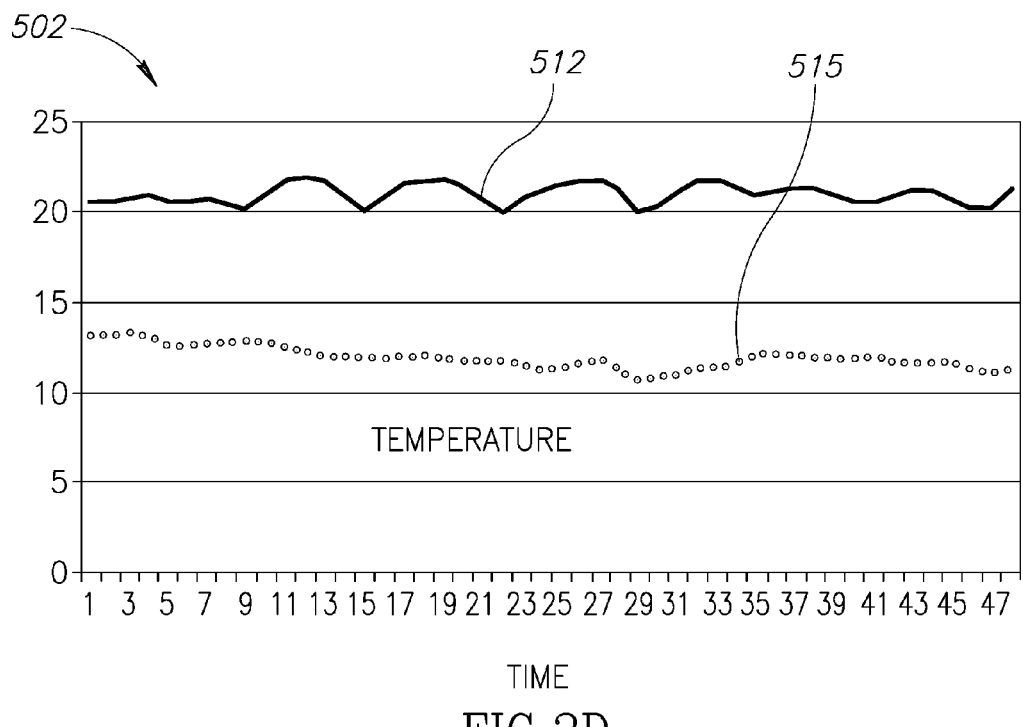

In an embodiment of the invention, controller 342 controls switching between flushing and maintenance modes of CCS 340, and durations of the modes, to maintain a relatively steady response to changes in temperature and relatively humidity of air in greenhouse 320. Cycling of CCS 340 between flushing and maintenance modes obviates the periodic greenhouse air replacements that characterize operation of conventional greenhouse environment control systems and provides relatively efficient control of greenhouse temperature and relative humidity. FIG. 2B shows a flow diagram 400 of an exemplary algorithm, also referenced by numeral 400, that describes operation of GECO 330 in controlling temperature and humidity in greenhouse 320, in accordance with an embodiment of the invention.

In flow diagram 400 it is assumed that, as in flow diagram 100 (FIG. 1B), initially, GECO 330 is in a quiescent state, in which radiators 42, 352 or 372 are not operating to heat air in or being drawn into greenhouse 320. Accordingly, a block 402 of the flow diagram shows that/greenhouse heating is off. In a block 404 controller 342 receives a measurement "T" of temperature in greenhouse 320 from temperature sensor 31 and a measurement "RH" of relative humidity of air in the greenhouse from humidity sensor 32. In a decision block 406, if T is greater than a desired minimum temperature $T_{Min}$ for example, 20° C., controller 342 returns to block 402. If however, T is less than or equal to $T_{Min}$, in a block 408 the controller turns inside heat exchanger 40 on, and in a block 410 turns CCS 340 (FIG. 2A) on in the flush mode. In the flush mode as noted above, heat exchanger 350 is turned on to vent air from inside greenhouse 320 and extract heat from the vented air and heat exchanger 370 is turned on to draw air into the greenhouse from the outside and heat the drawn in air with the heat extracted from the vented air. In a block 412 controller 342 acquires another measurement T of temperature and another measurement RH of relative humidity.

In a decision block 414 controller 342 determines whether T is less than or equal to $T_{Min}$. If $T \leq T_{Min}$, the controller leaves inside heat exchanger 40 on and CCS 340 in the flush mode, and returns to block 412, to acquire further measurements of T and RH and in decision block 414 to compare T to $T_{Min}$. If on the other hand, in decision block 414 the controller determines that $T > T_{Min}$, the controller continues to a decision block 416 and determines whether $RH < RH_{Max}$. If RH is greater than or equal to $RH_{Max}$, the controller optionally turns off inside heat exchanger 40 in a block 418 and returns to block 412 to again cycle through to block 418 leaving inside heat exchanger 40 off, until in decision block 416 controller 342 determines that a measurement RH is less than $RH_{Max}$. Upon determining that RH is less than $RH_{Max}$ controller 342 proceeds to a block 420 and switches CCS 340 to the maintenance mode.

In a block 422 controller 342 acquires measurements of T and RH and in a block 424 determines whether $T \leq T_{Min}$. If T less than or equal to $T_{Min}$, the controller returns to block 408 to turn on inside heat exchanger 40, turn on CCS 340 in the flush mode, and cycle through blocks in flow diagram 400 to block 424. If in decision block 424 $T > T_{Min}$, in a block 426 controller 342 determines whether temperature T is greater than a maximum desirable temperature $T_{Max}$. If T is greater than $T_{Max}$ the controller returns to block 402 and shuts down heating of air inside greenhouse 320. Optionally, $T_{Max}$ is a temperature equal to about 22° C. If on the other hand, T is less than or equal to $T_{Max}$, the controller proceeds to a decision block 428 to determine whether $RH < RH_{Max}$. If RH is less than $RH_{Max}$, the controller leaves CCS 340 in the maintenance mode and returns to block 422. If on the other hand RH is greater than or equal to $RH_{Max}$, the controller returns to block 410 and switches CCS 340 to operation in the flush mode.

Operation of GECO system 330 in accordance with an algorithm, such as algorithm 400 reduces magnitude of fluctuations in greenhouse temperature and relative humidity, and results in substantial savings in costs and amounts of energy required to control temperature and relative humidity in a greenhouse. FIGS. 2C and 2D show graphs 501 and 502 of relative humidity and temperature respectively of air inside and outside of greenhouse 320 controlled by a GECO system similar to GECO system 330 operating in accordance with an algorithm similar to algorithm 400.

In graphs 501 and 502 solid curves 511 and 512 respectively show relative humidity and temperature respectively for air inside greenhouse 320 as a function of time for a period of two days. Time in hours is shown along the graphs' abscissas. Dotted curves 514 and 515 show relative humidity and temperature respectively for air outside greenhouse 20 as a function of time for the same two day period.

The curves in graphs 501 and 502, as were the curves in graphs 201 and 202 (FIGS. 1C and 1D), were experimentally determined for a 3 m×1,000 m² greenhouse. Vent and intake radiators 352 and 372 had a length in a direction of air flow through the radiators equal to about 100 cm and a cross section perpendicular to the air flow equal to about 60 cm×60 cm. Each radiator comprised in its 100 cm×60 cm×60 cm volume, an array of 16 sets of 16 rows each of ⅝ inch copper pipe. Fan systems 354 and 374 were capable of streaming 1,500 m³/h (cubic meters of air per hour) through their respective associated radiators. Heat exchangers 350 and 370 were capable of extracting heat from heated water flowing through their copper pipes, or introducing heat into cooled water flowing in the pipes at rate of about 10 kW. Heat exchangers 350 and 370 were turned on for about 7 hours during each diurnal cycle. Whereas, when turned on, heat exchanger 40 in GECO system 330, operated at an energy consumption of about 290 kW, during each diurnal cycle it was turned on for about three and a third hours. An overall average energy consumption of GECO system 330 per diurnal cycle was about 1030 kWh.

From graphs 501 and 502 it is seen that neither the relative humidity, curve 511, and temperature of air, curve 512, in greenhouse 320 exhibit the large cyclical changes exhibited by relative humidity and temperature controlled by conventional environment control system 30 in greenhouse 20 (FIG. 1A). Temperature in greenhouse 320 fluctuates with amplitude of about 2° C. between about 20° C. and about 22° C., and relative humidity in the greenhouse fluctuates with an amplitude of about 8% between about 80% and about 87%. Not only does GECO system 330 provide substantially improved control of temperature and relative humidity in a greenhouse but it does it with substantially reduced energy consumption compared to a conventional greenhouse environment control system.

For example, as noted above, for external conditions of temperature and relative humidity of outside air indicated by curve 215 in graph 202 and curve 214 in graph 201 respectively, conventional greenhouse environment control system 30 may consume about 2,030 kWh of energy per diurnal cycle to control air in greenhouse 20 with proficiency represented by curves 212 and 211 in the graphs. A GECO system in accordance with an embodiment of the invention similar to GECO system 330 on the other hand, for conditions of relative humidity and temperature of outside air indicated by curve 514 in graph 501 and curve 515 in graph 502 respectively, may control humidity and temperature for greenhouse 320 with substantially improved proficiency exhibited by curves 511 and 512 in the graphs at an energy cost of 1,030 kWh per diurnal cycle. Whereas the conditions of temperature and relatively humidity of outside air under which GECO system 330 operates to control temperature and relative humidity of air in greenhouse 330 are substantially more demanding than the conditions of temperature and relative humidity of outside air under which conventional environment control system 30 operates, the GECO system operates at an average power consumption that is about half that at which the conventional system operates.

It is noted that the energy consumption and flow rates referred to above for GECO system 330 that controls an environment for a 3 m×1,000 m² greenhouse and provides performance substantially as shown in graphs 501 and 502, scale substantially linearly with greenhouse size. For example, a GECO system in accordance with an embodiment of the used to control the environment in a 3 m×2,000 m² greenhouse may be configured to consume twice the energy and provide twice the flow rates provided by a GECO system that controls the environment in a 3 m×1,000 m² greenhouse.

In some embodiments of the invention, controller 342 controls GECO 330 to switch between flush and maintenance modes at optionally predetermined regular intervals. For example, a GECO system similar to GECO 330 in accordance with an embodiment of the invention may operate in flush and maintenance modes for about six and about fifty four minutes respectively every hour can maintain a greenhouse temperature between about 20° C. and about 22° C., and relative humidity between about 80% and about 87%, for outside air and relative humidities for which graphs 501 and 502 were obtained.

To provide added protection for plants against disease encouraged or promoted by water condensation on plant leaves and body parts, a greenhouse may comprise a WAGIT in accordance with an embodiment of the invention that operates to sonically clean surfaces of leaves and plant parts of moisture that may have accumulated on the surfaces.

Figure 3:
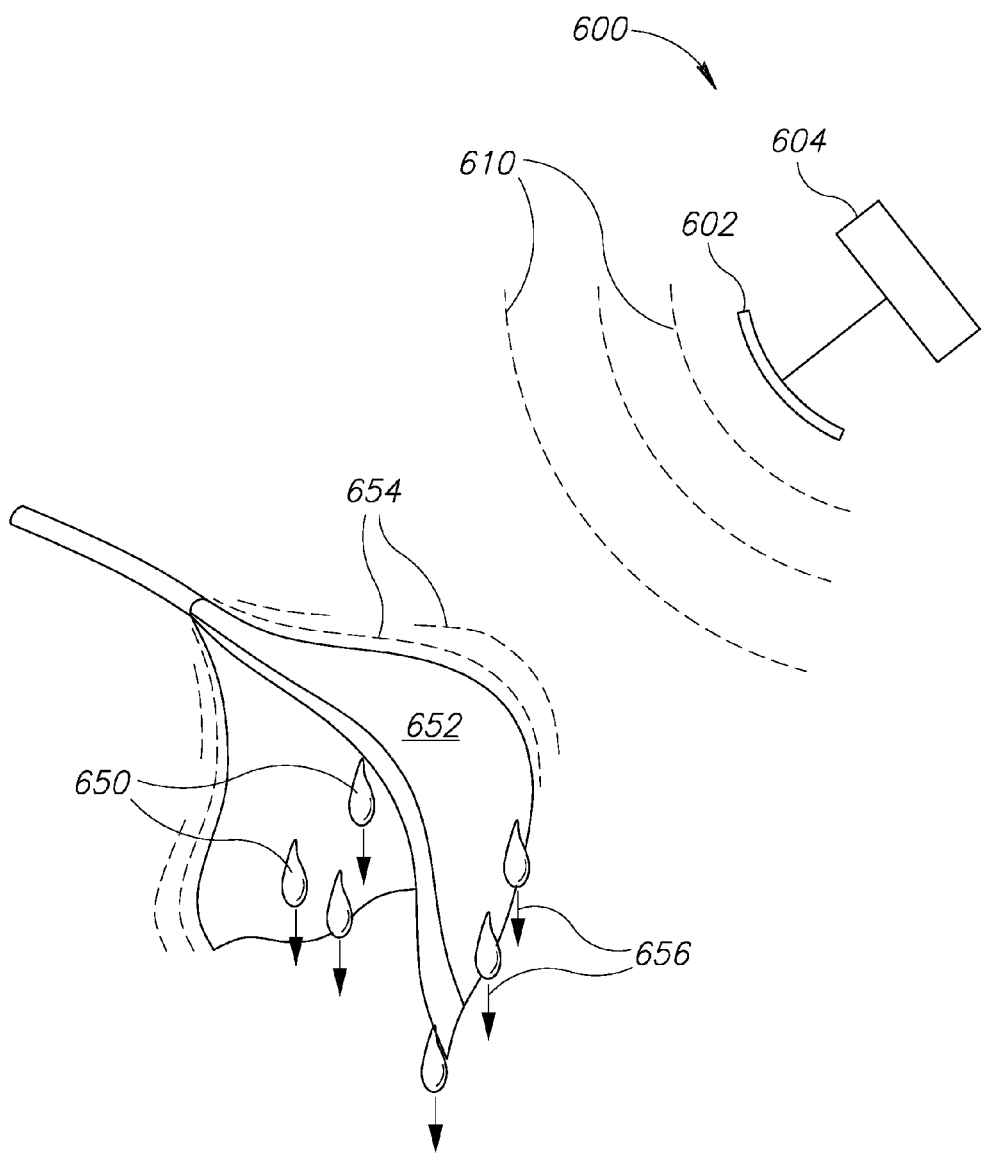
FIG. 3 schematically shows operation of a WAGIT moisture removal system operating to remove moisture from a leaf in accordance with an embodiment of the invention.

FIG. 3 schematically shows a WAGIT 600 operating to remove water droplets 650 condensed on a plant leaf 652, in accordance with an embodiment of the invention. WAGIT 600 optionally comprises an acoustic transducer 602, such as a piezoelectric crystal, driven by a power source 604 to generate acoustic waves, schematically represented by dashed arcs 610 that propagate to leaf 652. When sonic waves 610 are incident on leaf 652 they generate large amplitude vibrations, represented by dashed silhouettes 654, in the leaf that shake water droplets 650 off the leaf. The removal of the water droplets is schematically indicated by arrows 656.

In an embodiment of the invention, power source 604 drives transducer 602 to generate waves 610 at a frequency substantially coincident with a resonant frequency of leaf 652. As a result, acoustic waves 610 generate relatively large vibrations in leaf 652 that are relatively efficient in shaking droplets 650 off the leaf. Optionally, power source 604 drives acoustic transducer 602 to generate acoustic waves at a resonant frequency of water droplets 650, which generate relatively large vibrations in the bodies of the droplets. The vibrations cause the droplet to "roll" off leaf 652.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. Apparatus for controlling an environment in a greenhouse, the apparatus comprising:
   a first heat exchanger, comprising a first radiator and a first fan system for driving air through the first radiator and a second heat exchanger comprising a second radiator and a second fan system for driving air through the second radiator;
   a first refrigerant circulation system that circulates a refrigerant fluid between and through the first and second radiators;
   a heater controllable to heat the refrigerant;
   a controller that controls the apparatus to operate selectively in a maintenance mode or a flush mode, wherein in the maintenance mode the heater heats the refrigerant and the first and second fan systems drive air from outside to inside the greenhouse and through the first and second radiators to acquire heat from the refrigerant, and in the flush mode the first fan system vents air from inside to outside the greenhouse through the first radiator to deposit heat in the refrigerant and the second fan system drives air from outside to inside the greenhouse and through the second radiator to acquire the heat deposited in the refrigerant.

2. Apparatus according to claim 1 and comprising a third heat exchanger controllable to heat air inside the greenhouse.

3. Apparatus according to claim 2 wherein the third heat exchanger comprises a radiator, a second refrigerant flow system that streams a refrigerant through the radiator, a heater that heats the refrigerant in the second refrigerant flow system and a fan system that drives air inside the greenhouse through the radiator to acquire heat from the refrigerant.

4. Apparatus according to claim 3 and comprising a fluid flow control valve controllable to connect the first and second refrigerant flow systems so that heated refrigerant from the second refrigerant flow system can flow into the first refrigerant flow system.

5. Apparatus according to claim 4 wherein in the maintenance mode, the controller controls the fluid control valve to connect the first and second refrigerant flow systems.

6. Apparatus according to claim 2 wherein in the maintenance mode, the controller controls the third heat exchanger to substantially refrain from heating air inside the greenhouse.

7. Apparatus according to claim 2 wherein the controller controls the third heat exchanger to heat air inside the greenhouse when temperature of the inside air drops below a predetermined minimum air temperature.

8. Apparatus according to claim 1 wherein in the maintenance mode the controller controls the fan systems of the first and second heat exchangers to draw air from outside to inside the greenhouse at an average flow rate that is substantially proportional to a volume of the greenhouse.

9. Apparatus according to claim 8 wherein the average flow rate is greater than about 2,500 m$^3$/hr (cubic meters per hour) and less than about 3,500 m$^3$/hr per 3,000 m$^3$ of greenhouse volume.

10. Apparatus according to claim 1 wherein the controller controls the apparatus to operate in a flush mode if relative humidity in the greenhouse is greater than a predetermined maximum relative humidity.

11. Apparatus according to claim 1 wherein the controller switches operation of the apparatus between flush and maintenance modes at regular intervals.

12. Apparatus according to claim 11 wherein duration of a period of operation in the flush mode is the same for each of a plurality of consecutive periods of operation in the flush mode.

13. Apparatus according to claim 12 wherein the flush mode periods are repeated at a repetition frequency of about between 0.8 and about 1.2 per hour.

14. Apparatus according to claim 1 wherein periods of operation in the flush mode have durations of between about 5 minutes and about 10 minutes.

15. Apparatus according to claim 1 wherein the controller initiates periods of operation in the maintenance mode substantially at times at which periods of operation in the flush mode end.

* * * * *